United States Patent Office 3,023,787
Patented Mar. 6, 1962

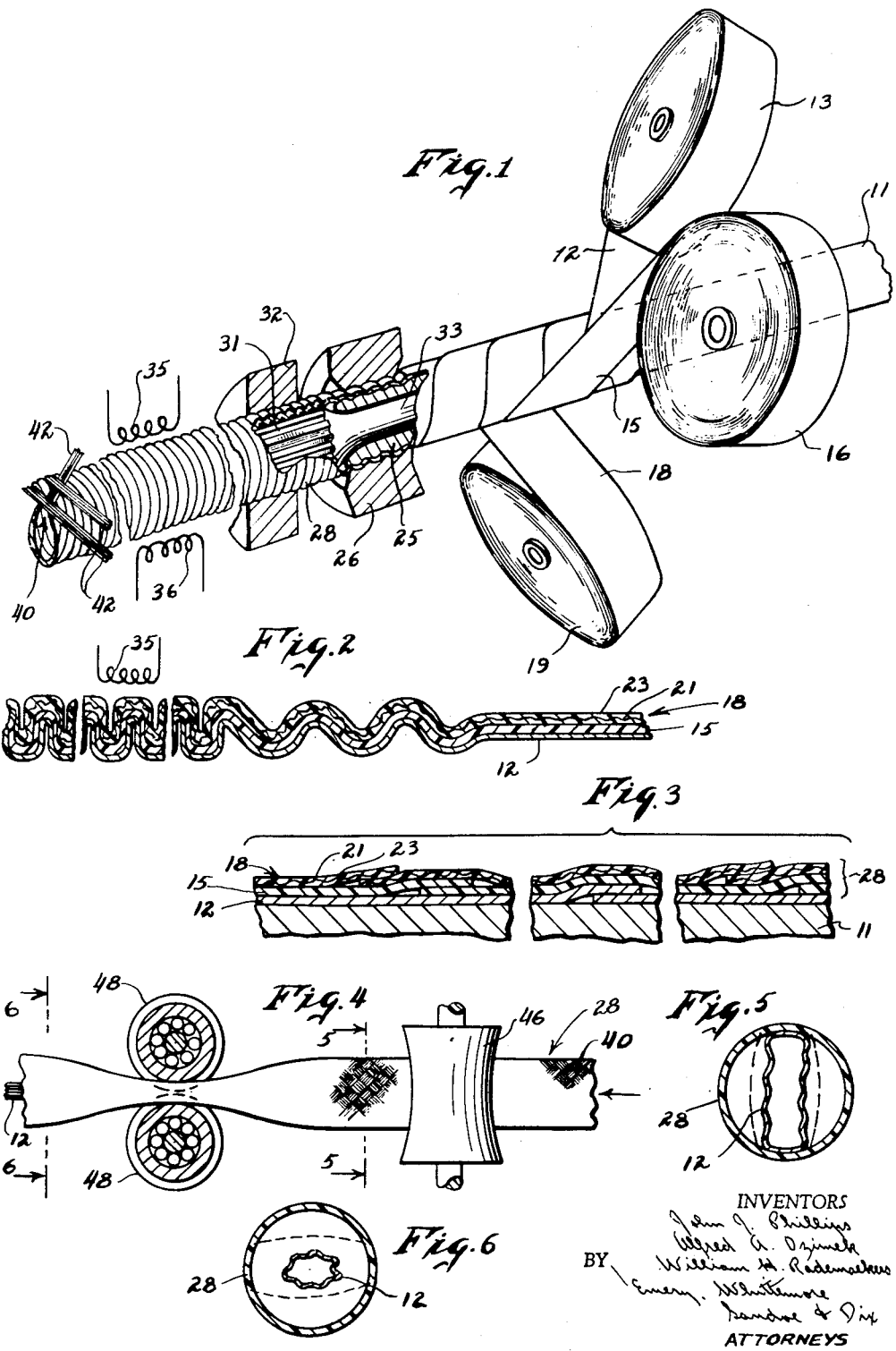

3,023,787
REINFORCED FLEXIBLE PLASTIC HOSE AND METHOD OF MAKING
John J. Phillips, Palmer, Mass., Alfred A. Ozimek, Elizabeth, N.J., and William H. Rademaekers, Wilbraham, Mass., assignors to Titeflex, Inc., Springfield, Mass., a corporation of Massachusetts
Filed Oct. 31, 1957, Ser. No. 693,619
2 Claims. (Cl. 138—121)

This invention relates to plastic hose and to methods of making such hose. More specifically, it relates to hose made with "Teflon," a plastic manufactured by E. I. Du Pont de Nemours of Wilmington, Delaware and consisting of polytetrofluoroethylene.

One object of the invention is to provide an improved flexible plastic hose reinforced with fibreglass; the interior of the hose being plastic so that the hose has the chemical properties of the plastic. Another object is to provide a braid-covered plastic hose with an intermediate layer of fiber glass to protect the plastic from chafing by the braid.

Another object is to provide a method of making corrugated plastic hose by using an inner layer of malleable material which serves as a collapsible mandrel or shield for retaining the plastic in place during curing, fusing, or sintering of the plastic. Whether the plastic is cured, fused or sintered depends, of course, upon what plastic is used, but the expression "heat treating" is used herein as a generic expression to designate any of these treatments of the plastic.

The preferred embodiment of the invention is a Teflon hose made by wrapping flat strip material in a helix and with an inner layer of metal foil, such as aluminum foil, which prevents inward flow of the Teflon when it is subsequently heated to sinter it. The metal foil is then removed from within the hose by a rolling operation that makes practical the removal of the foil from tubes of any length.

Another advantage of the inner layer of metal foil, in combination with Teflon, is that it facilitates the heating of the Teflon by induction heating. Teflon must be heated above 620° F. for sintering, and it is difficult to heat by induction heating. The metal layer is readily heated and transmits its heat directly to the adjacent Teflon.

Still another object is to provide a plastic hose with fibreglass reinforcing fibres and with the side walls of the hose corrugated so that the plastic at successive locations along the length of the hose is held in position by the unstretchable glass fibres in conjunction with the metal foil layer. This provides a more secure and reliable bond between the different layers of strip material from which the hose is wound.

Other objects, features and advantages of the invention will appear or be pointed out as the description proceeds.

In the drawing, forming a part hereof, in which like reference characters indicate corresponding parts in all the views:

FIGURE 1 is a diagrammatic, isometric view showing the hose of this invention and illustrating the method by which it is made;

FIGURE 2 is an enlarged sectional view through a portion of the wall of the hose during the different steps in its manufacture;

FIGURE 3 is a greatly enlarged sectional view through the hose wall showing the different layers;

FIGURE 4 is a diagrammatic view illustrating the way in which the hose is rolled to release the inner layer of metal foil; and FIGURES 5 and 6 are sectional views taken on the lines 5—5 and 6—6, respectively, of FIGURE 4.

FIGURE 1 shows a mandrel 11 about which strips of material are wrapped to form the hose of this invention. In the preferred construction, a strip of aluminum foil 12 is initially wrapped on the mandrel 11 from a reel 13. Although aluminum foil is preferred, other metal foil can be used, such as copper or other malleable foil. The mandrel 11 may be rotated, but the strip 12 can be wrapped by moving the reel 13 with an orbital movement around a stationary mandrel. The mandrel can be lubricated in the conventional way to facilitate stripping of the helically wound foil strip 12 from the mandrel, but conventional lubricants char and discolor the inside of the hose in subsequent heat treatment. In the preferred embodiment of the invention a light film of plastic, such as Teflon, is coated on the side of the foil strip that contacts with the mandrel 11, and this plastic serves as a solid lubricant.

A strip of Teflon tape 15 is wrapped over the inner layer formed by the strip 12. The Teflon tape 15 is supplied from a reel 16. More than one Teflon tape 15 can be wrapped on the mandrel, depending upon the desired wall thickness for the hose; and it will be understood that the tape 15 is representative of a layer of plastic material wrapped over the inner foil layer and consisting of one or more superimposed strips of tape.

In the preferred construction, outside of the layer of plastic tape 15, a composite strip 18 is wrapped around the mandrel, the strip 18 being supplied from a reel 19. This strip 18 consists of reinforcing fibres preferably coated with plastic material which in the illustrated construction is the same plastic as the inner layer. In the preferred construction, the strip 18 consists of a woven fibreglass fabric 21 (FIGURES 2 and 3) impregnated with Teflon 23. The Teflon 23 fills the interstices of the woven fabric 21, covers the glass fibres of the fabric 21 so that the glass fibres are completely covered by the Teflon, and improves the bond of the glass to the Teflon liner.

The strips 12, 15 and 18 are maintained under tension so that they wrap tightly and the hose is passed between corrugating apparatus consisting of a grooving worm 25 and a grooving nut 26. The worm 25 is located within the hose and is supported internally through mandrel 11; and the nut 26 surrounds the outside of the hose and is supported from any suitable outside source. The worm 25 and nut 26 are rotated in the same direction and they are located at a fixed station along the length of the mandrel so that the rotation of the threads of the worm 25 and nut 26 feeds the hose forwardly.

Beyond the worm 25 and the nut 26, the hose, designated by the reference character 28, passes between a snubber or inner compressing element 31 and an outer threaded forming element 32. The inner compressing element provides a brake for retarding the axial movement of the hose as well as retarding rotation of the hose. The thread on the outer forming element 32 has a lesser pitch than the threads on the worm 25 and nut 26 and they are rotated at the same speed as the worm and nut so that, with the movement of the tube retarded by the compressing element 31, the sides of the hose corrugations are crowded close together and shaped by the outer forming element 32, as clearly shown in FIGURE 2. The breaking of the axial movement may be performed by an outside element, if desired.

The inner compressing element 31 is supported from a bar 33 which extends through the hollow interior of the mandrel 11, and the outer compressing element 32 is supported from any suitable outside source. As in the case of the worm 25 and nut 26, the compressing elements 31 and 32 are maintained at a fixed station axially of the hose. The inner compressing element 31 does not rotate, and its supporting bar 33 is connected to a fixed frame beyond the end of the mandrel 11, when using a rotating mandrel. This apparaus for corrugating the hose 28 and for pressing the corrugations closer together is of the type disclosed in Patents Numbers 2,002,896; 2,033,717 and 2,656,617.

After being corrugated in the manner already described, the hose is given a heat treatment to bring the plastic to the desired final condition. In the case of Teflon, the hose is subjected to a sintering temperature above 620° F., this sintering being necessary to give Teflon the strength and other desired physical and chemical characteristics and the operation is used in substantially all Teflon hose manufacture and is well understood in the art. In the drawing, the sintering operation is illustrated diagrammatically by passage of the hose between induction coils 35 and 36.

The tube formed by the inner layer of metal foil has a high di-electric loss; and when induction heating is used, the Teflon is heated largely by conduction of heat to the Teflon from the metal foil. The heat for sintering the Teflon can be generated by electrical resistance, the metal foil being used as a conductor and a heavy current being passed through the foil from brushes or other electrical connections. The more conventional heating by passage through a furnace can be used. It will be understood, therefore, that in the broader aspects of the invention, the induction heating shown in the drawing is merely representative of means for heating and sintering the Teflon.

The final step in the manufacture of the hose of this invention is the application of a metal braid 40 to the outside of the hose. This step is illustrated diagrammatically in FIGURE 1 by the application of different strands 42 to the outside of the hose. The braiding of plastic hose for greater strength is well understood in the art and no further illustration of the braiding is necessary for a complete understanding of this invention.

Since the hose is made of Teflon, or other plastic, in order to obtain the chemical properties of the Teflon it is necessary to remove the inner layer of metal foil 12 from the hose. This can be done either before or after the braiding operation but must be done after the heat treating because the principal purpose of the metal foil is to prevent excessive contraction of the Teflon layer as it cools after the heat treatment.

FIGURES 4–6 illustrtate the way in which the inner layer of foil 12 is removed. The hose 28 is passed between rollers 46 which compress the hose laterally. The plastic layers of the hose recover their original shape after passing beyond the rollers 46 but the malleable inner layer of foil 12 is crushed by the flattening of the hose between the rollers 46 and remains crushed, as shown in FIGURE 5. Because of the flexing of the hose wall as it passes into and out of the bite of the rollers 46, the spaces between the corrugations spread and this facilitates the removal of the inner layer from the corrugations.

Beyond the rollers 46, the hose 28 passes between two other rollers 48 which flatten the hose in a direction at right angles to that in which it was flattened by the rollers 46. This crushes the foil 12 in the other direction and leaves it as a string of irregular cross section and free of the corrugations of the hose wall so that the foil can be pulled out of the hose.

This rolling procedure to remove the foil 11 is unnecessary if the hose is to be pressure tested with the foil in place. The pressure test expands the hose. The foil will not stretch and comes loose from the corrugations when the hose stretches. The foil can then be pulled out of the hose as easily as after the rolling procedure of FIGURES 4–6.

The preferred embodiment of the invention has been illustrated and described, but changes and modifications can be made and some features can be used in different combinations without departing from the invention as defined in the claims.

What is claimed is:

1. An interim product of manufacture comprising a hose having a wall made of Teflon with fibreglass reinforcing imbedded therein and an inner layer of the wall consisting of other material, the reinforced Teflon being resilient whereby it springs back when the hose is flattened and the flattening force is removed, and the other material being malleable whereby the inner layer remains in a crushed condition after the hose has been flattened, the wall of the hose including the inner layer being corrugated with generally circumferential corrugations which interlock the inner layer and the Teflon and fibreglass in a composite wall structure.

2. An interim product of manufacture comprising helically wound strip of malleable metal forming an internal tube, a strip of Teflon wound in tubular form on said metal strip, a strip of Teflon impregnated fiber glass wound in tubular form on said Teflon strip, said strips compositely forming a length of hose, said hose being corrugated with generally circumferential corrugations.

References Cited in the file of this patent

UNITED STATES PATENTS

| | | |
|---|---|---|
| 2,396,059 | Roberts | Mar. 5, 1946 |
| 2,508,774 | Roberts | May 23, 1950 |
| 2,584,501 | Roberts | Feb. 5, 1952 |
| 2,674,297 | Greenwald | Apr. 6, 1954 |
| 2,757,691 | Copeland | Aug. 7, 1956 |
| 2,783,173 | Walker et al. | Feb. 26, 1957 |
| 2,787,289 | Press | Apr. 2, 1957 |
| 2,888,042 | St. John et al. | May 26, 1959 |